United States Patent [19]
Tackett

[11] Patent Number: 5,601,345
[45] Date of Patent: Feb. 11, 1997

[54] STATIONARY SEAL ABS PUMP

[75] Inventor: Wendell D. Tackett, Ann Arbor, Mich.

[73] Assignee: Kelsey-Hayes Company, Romulus, Mich.

[21] Appl. No.: 358,233

[22] Filed: Dec. 16, 1994

[51] Int. Cl.$^6$ ........................................ B60T 8/40
[52] U.S. Cl. ............................. 303/116.4; 303/116.3; 277/103
[58] Field of Search ..................... 303/116.4, 116.3; 277/102, 103

[56] References Cited

U.S. PATENT DOCUMENTS

| | | | |
|---|---|---|---|
| 4,354,715 | 10/1982 | Farr | 303/116.4 |
| 4,387,934 | 6/1986 | Farr | 303/116.4 |
| 4,715,666 | 12/1987 | Farr | 303/116.4 |
| 4,875,741 | 10/1989 | Ozawa | 303/116.4 |
| 4,941,713 | 4/1990 | Farr | 303/116.4 |
| 4,962,972 | 10/1990 | Pizzo | 303/116.4 |
| 5,172,956 | 12/1992 | Klose | 303/116.4 |
| 5,213,482 | 5/1993 | Reinartz | 303/116.4 |

Primary Examiner—Robert J. Oberleitner
Assistant Examiner—C. T. Bartz
Attorney, Agent, or Firm—MacMillan, Sobanski & Todd

[57] ABSTRACT

A piston-type pump suitable for use in vehicle control systems contains a piston element sliding within a stepped bore of a pump body, leakage of fluid past the piston element being prevented through use of a stationary seal surrounding the piston element and located at the end of the larger diameter stepped bore and fixed at that position by the end of a plug which is preferably shaped so as to include within the plug the pump cavity. The outer end of the piston element is urged by a return spring contained within the pump cavity against an oscillatory driving unit. Inlet and outlet check valves ensure unidirectional flow of hydraulic fluid.

20 Claims, 2 Drawing Sheets

STATIONARY SEAL ABS PUMP

TECHNICAL FIELD

The present invention pertains to high pressure piston pumps suitable for use in vehicle control systems such as Automatic Braking Systems (ABS) and Traction Control Systems (TCS). More particularly, the present invention pertains to a piston-type pump which employs a stationary high pressure seal located in an annulus surrounding the piston element against which the seal slidingly engages.

BACKGROUND ART

ABS systems have developed from the original high cost, bulky devices to the point where ABS systems are now standard on many vehicles. One of the principle components of an ABS system is a high pressure pump which enables rapid pulsing of the brake components when the system detects a lock condition. Such pumps may also be used in vehicle control systems. Hereinafter, pumps or systems for both ABS and TCS will be referred to as "ABS pumps or systems." High pressure pumps may be made of cast iron or steel with a steel piston driven by a kinematic chain, generally a cam-type eccentric or serpentine-type oscillatory drive member. The piston is forced against the drive member by the pressure of a spring incorporated within the cylinder in which the piston travels.

In order to seal the fluid within the pump, a high pressure O-ring type seal has been located in a circumferential groove in the piston element. Pumps such as these have been highly effective and demonstrate minimal wear on the pump body due to abrasion at the seal/pump body interface.

The weight of such pumps is considerable, however, and efforts have been made to reduce the weight of the pump. To this end, a sleeve-type pump has been developed which employs aluminum as the pump body and a steel or cast iron sleeve within which the piston travels. In sleeve-type pumps, however, the aluminum body must be made larger than desirable in order to accommodate the sleeve without weakening the body. Moreover, it is necessary that the sleeve itself be sealed with respect to the body, and thus multiple O-ring seals must be used.

The need to incorporate a separate sleeve with its attendant seals decreases, to an extent, the advantages of reducing weight through the use of an aluminum pump body. The necessity of providing and machining a separate sleeve further adds to manufacturing costs. Furthermore, the traditional location of inlet and outlet check valves, necessary to achieve one-way flow of fluid, adds complexity and attendant cost to the machining and assembly of high pressure ABS pumps.

SUMMARY OF THE INVENTION

It has now been discovered that an improved ABS pump may be manufactured with an aluminum body without resorting to the necessity for a piston-encompassing sleeve by incorporating a stationary seal into an annular recess in the aluminum pump body. The improved ABS pump may be manufactured with reduced size of the pump body and with minimal part count, thus reducing both the weight and manufacturing cost of the ABS pump.

The invention contemplates revising the seal location so that the seal is held stationary with respect to the pump body which is preferably of light alloy construction, the seal lip disposed on the reciprocating surface of the piston element.

The subject invention therefore pertains to a piston-type pump suitable for use in supplying pressurized fluid to an ABS system, having a pump body containing a bore adapted to receive a piston element; a piston element having an elongated portion, the elongated portion sliding in the bore, one end of the piston element extending outwardly beyond the pump body; a return spring urging the piston outward of the pump body and onto sliding engagement with a drive member capable of imparting an oscillatory motion to the piston element; a stationary seal sealingly engaging the piston element; a pump cavity whose internal volume changes in response to the oscillatory motion of the piston element; inlet/outlet passages communicating with the pump cavity; and inlet and outlet check valves adapted to ensure unidirectional flow of fluid through the inlet/outlet passages.

The subject invention further pertains to a piston-type pump suitable for use in supplying pressurized fluid to an ABS system, having a pump body containing a stepped bore having at least a first diameter and a second diameter, the second diameter being larger than the first diameter; a piston element having an elongated portion, the elongated portion sliding in the stepped bore of first diameter, one end of the piston element extending outwardly beyond the pump body; a return spring urging the piston outward of the pump body and onto sliding engagement with a drive member capable of imparting an oscillatory motion to the piston element; a stationary seal sealingly engaging the piston element and maintained in a recess defined by an end of the stepped bore of larger diameter and a plug element fixed in the stepped bore of larger diameter; a pump cavity whose internal volume changes in response to the oscillatory motion of the piston element; inlet/outlet passages communicating with the pump cavity; and inlet and outlet check valves adapted to ensure unidirectional flow of fluid through the inlet/outlet passages.

The subject invention further pertains to an ABS pump as disclosed herein, in which both the inlet and outlet check valves are contained within a common check valve bore, this bore preferably being parallel to the axis of the piston bore. Most preferably, the inlet and outlet check valves comprise a unitary assembly which may be inserted into the check valve bore.

DESCRIPTION OF THE PREFERRED EMBODIMENTS

Figure 1:
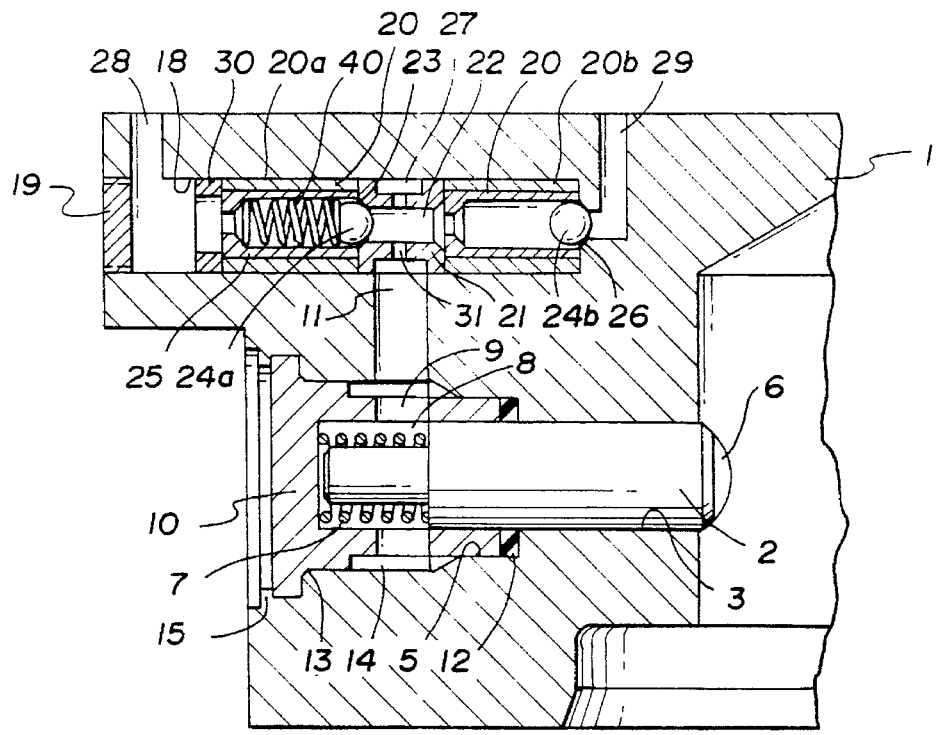
FIG. 1 illustrates one embodiment of the subject invention ABS pump, incorporating an external inlet/outlet check valve assembly.

The improved ABS pump of the present invention employs a piston element sliding directly within the bore of the pump body, which is advantageously constructed of a light metal or metal alloy such as aluminum. While aluminum is a metal of choice in modern vehicle design due to its light weight, it is also known for its susceptibility to abrasion as compared to cast iron and steel. The preferred material for the pump body is extruded aluminum alloy such as 6061T6. The pump bore may be machined directly in the pump body and generally has a surface roughness of up to 32 microinches RMS, preferably from about 8 to about 32 microinches RMS.

Leakage of fluid under pressure into the interstices between the portion of the piston element sliding within the bore and the bore itself is prevented through the use of a stationary seal of resilient material located in the bore between the pump cavity and the piston element, preferably at a shoulder of a step in the bore, and maintained in this position by means of the end of a plug which forms the pump cavity. The piston is preferably of steel, although other materials may suffice. Preferred is machine screw grade alloy steel such as 1215 alloy, finished to a maximum surface roughness of approximately 16 microinches RMS, preferably within the range of from about 8 to about 16 microinches RMS.

The pump cavity further contains a return spring which urges the outwardly extending end of the piston element against a driving means, the return spring and driving means coacting to impart oscillatory motion to the piston element. The piston element preferably contains on its inward portion, that is, the portion located within the pump cavity, a portion of reduced diameter which serves to locate the return spring and eliminate a bending mode in compression. One end of the spring abuts the shoulder formed in the piston element at the junction of the portion of reduced diameter with the larger diameter portion.

The pump further contains a check valve system to ensure one-way flow of fluid. The check valves, which are advantageously of the check ball type, may be integral, i.e. within the pump cavity, or may be external, residing in one or more separate bore(s). Most preferably, both inlet and outlet check valves are located in a common separate bore, this bore preferably being located as close to the pump cavity as possible. For ease of machining, the check valve bore may be parallel to the pump bore. However, for maximum efficiency, a location substantially perpendicular to the bore and displaced from the pump bore by a suitable distance may be preferable.

The plug which serves to form the pump cavity and maintain the stationary seal in place, may be of one or multiple part construction. The seal between the plug and the pump body may be made through the use of an O-ring seal maintained in an annular groove in the plug or trapped in a stepped recess by a shoulder of the plug, but preferably is a metal-to-metal seal formed by a conical shoulder of the plug abutting against a conical recess in the pump body. In the latter case, the pressure required to seal the plug may be supplied by threaded engagement between the plug and pump body, or by staking over a portion of the pump body onto the external periphery of the plug. Use of either of these arrangements minimizes part count.

With reference to FIG. 1, solid piston element 2 slides within bore 3 of pump body 1, and is driven in oscillatory motion by the outwardly extending end 6 of the piston element bearing against a driving means (not shown), generally of the cam, serpentine, or swash-plate type. The piston is maintained in sliding contact with the driving means by return spring 7 located within the pump cavity. The piston, upon the compression stroke, acts against spring 7 and directs the hydraulic fluid contained within the cavity 8 under pressure through radial passage(s) 9 in plug 10 through passage 11 in pump body 1 to the external inlet/outlet check valve assembly. The hydraulic fluid is prevented from leaking past piston element 2 by elastomeric stationary sealing ring 12 which is captured at the end of bore 5 by the end of plug 10, and which sealingly bears against the reciprocating surface of piston element 2. The plug 10 bears a radiused or conical shoulder 13, preferably conical, which mates against a corresponding shoulder in bore 5 to seal the end of the pump opposite the outwardly extending end of the piston element. The plug 10 may have a portion of its diameter less than that of bore 5 thus providing an annular passage 14 to facilitate flow of fluid on the pumping stroke. Annular passage 14 may advantageously contain a filter element, for example, one of porous elastomeric material, compacted fibrous metal, sintered metal, or the like, to facilitate capture of particulates resulting from contamination of the hydraulic fluid or wear of the pump or piston surfaces. Plug 10 is preferably an interference fit in the bore or more preferably is maintained in the bore by staked-over portion 15 of the pump body.

The external inlet-outlet check valve may be of any type, but preferably is a prefabricated assembly inserted through bore 18 which is subsequently sealed by plug 19. The inlet/outlet check valve assembly may be maintained in bore 18 by any convenient means, for example, by a snap-ring, by threaded engagement, or by a press fit. The inlet/outlet check valve assembly shown comprises a sleeve 20 which may be equipped with external threads if it is to be threadably maintained in bore 18. The sleeve is conveniently made in two parts 20a and 20b, connected to each other by tubular connector 21 with a slight press fit to allow the assembly to be handled and installed as a unit. Connector 21 carries an annular groove 27 to facilitate fluid flow, and surrounds bore 22 which is shaped on at least a first end with conical seat 23 adapted to receive check ball 24a, carried by check ball carrier 25. For convenience of assembly, connector 21 is similarly equipped with a conical seat on the second end, as shown. Connector 21 may further contain a transverse passage 31, again to facilitate fluid flow.

Sleeves 20a and 20b are preferably identical for simplicity of manufacture and assembly. Check ball carrier 25 may contain an internal check ball spring 40. Preferably, the outlet check valve carrier is fitted with a check ball spring, while the inlet check ball carrier operates without a spring in order to impose minimal constraint on entry of low pressure fluid into the pump. The inlet check valve thus may operate at substantially atmospheric pressure. The inlet/outlet assembly is maintained in bore 18 by fitting 30 which may be externally threaded or by a press fit in bore 18. Alternatively, the entire prefabricated assembly may be a press fit in bore 18, or the fitting 30 may be made an extension of plug 19. The seat for check ball 24b is machined into the pump body and is shown at 26. While operation of the check valve assembly is given herein in detail, the details of the assembly itself form no part of the subject invention, and may be substituted by numerous adaptations by one skilled in the art.

In operation, pressurized fluid from the ABS pump flows from pump cavity 8 through passages 9, 11, 31 and 22 through connector 21, forcing check ball 24a away from its seat at the end of carrier 25 against the pressure of check ball spring 40, thus providing an exit for pressurized fluid through outlet channel 28. At the same time, check ball 24b is urged against its seat 26 preventing reverse fluid flow through the inlet 29. Upon the return stroke of piston 2 facilitated by return spring 7, check ball 24a is urged against seat 23a preventing fluid flow into the pump from outlet channel 28. At the same time, the diminished pressure in the pump cavity allows check ball 24b to recede from its seat allowing fluid to flow through inlet channel 29 and connector 21 into channel 11.

Figure 2:
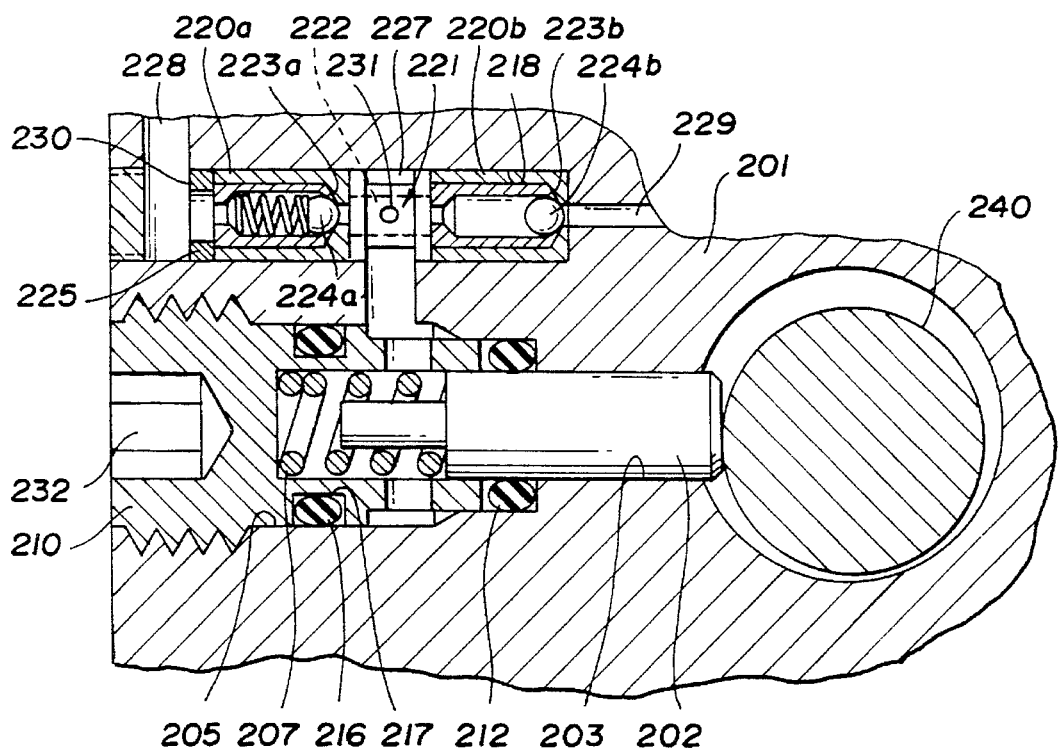
FIG. 2 illustrates a further embodiment of the subject invention ABS pump, also incorporating an external inlet/outlet check valve assembly.

Referring now to FIG. 2, piston element 202 is driven in oscillatory motion within pump body 201 and bore 203 by eccentric 240 against the pressure of piston return spring 207. Plug 210 is threadingly engaged in bore 205 and is sealed by means of sealing ring 216 trapped in an annular groove 217 in plug 210. As in FIG. 1, hydraulic fluid is prevented leaking past piston element 202 by stationary seal 212. Insertion and removal of plug 210 is facilitated by hexagonal recess 232.

In FIG. 2, connector 21 has been replaced by insert 221 which contains annular groove 227, transverse passage 231 and through bore 222. Insert 221 is designed to be a sliding fit within bore 218. Sleeves 220a and 220b are machined to contain check-ball seats 223a and 223b. Alternatively, sleeve 220b may be a plain sleeve with the check ball seat machined in the pump body at the end of bore 218, similar to 26 in FIG. 1. Sleeves 220a and 220b and insert 221 are maintained in bore 218 by fitting 230, analogously to FIG. 1. Both check ball carriers (225) are similar to those in FIG. 1, carrying check balls 224a and 224b and will not be described further.

On the opposite side of insert ring 221 is located check ball 224b which sealingly engages seat 223b formed in the end of sleeve 220b. In operation, the pressure stroke of piston element 202 forces check ball 224a away from seat 223a allowing pressurized fluid to exit through outlet channel 228. At the same time, check ball 224b is urged by the hydraulic pressure firmly against its seat 223b. On the return stroke of piston 202 facilitated by return spring 207, the pressure in the outlet channel forces check ball 224a firmly against seat 223a preventing backflow of fluid, while check ball 224b withdraws from seat 226b allowing fluid to flow through inlet channel 229 into the pump.

Figure 3:
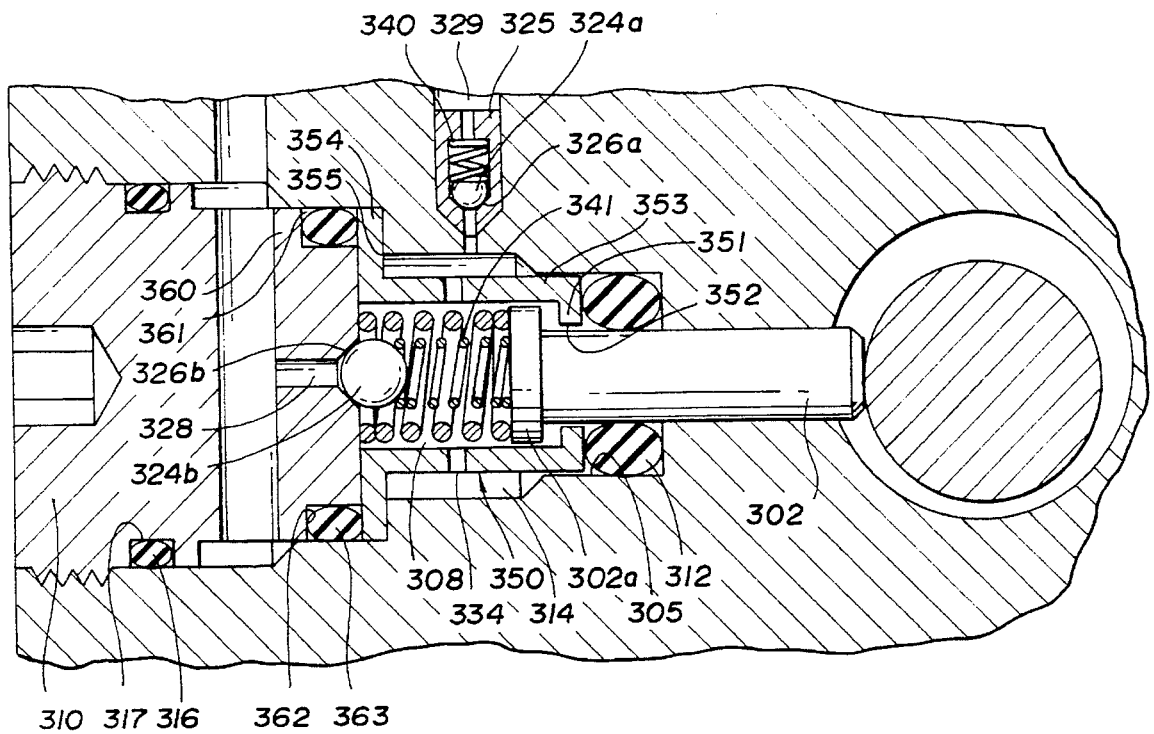
FIG. 3 illustrates a further embodiment of the subject invention ABS pump employing an integral inlet check valve and an external outlet check valve.

FIG. 3 illustrates a further embodiment of an ABS pump of the subject invention. In this case, the piston element 302 is adapted, for example by machining, to include a portion of enlarged diameter 302a. The pump cavity proper 308 is of a diameter corresponding to the diameter of enlarged piston portion 302a, and larger than the remainder of the piston 302. Pump cavity 308 is defined by cavity element 350 which contains a first radial portion 351 containing a bore 352 and continuously connected to cylindrical portion 353 which is continuously connected to second radial portion 354. Radial portions 351 and 354 form flanges, the flange corresponding to radial portion 351 extending inwardly and adapted to capture stationary piston sealing ring 312 in the recess between radial portion 351 and the end of bore 305. Radial portion 354 extends outwardly and abuts shoulder 355.

Check plug 360 is stepped in diameter forming a recess 361 between shoulder 362 and radial portion 354 of cavity element 350, the recess 361 adapted to receive sealing ring 363. A check ball 324b is urged against seat 326b by check ball spring 341, and is urged further by the pressure generated during the pressure stroke of the pump, thus preventing fluid from flowing through inlet path 328.

Outlet check ball 324a located in carrier 325 seals against internal seat 326a formed in carrier 325. On the pressure stroke of the pump, check ball 324a is forced away from its seat allowing passage of pressurized fluid through radial holes 334 in cavity element 350 which communicates with annular cavity 314 formed as a stepped portion of bore 305, to outlet channel 329. On the return stroke of the piston, the check ball is forced against its seat 326a by the pressure of check ball spring 340.

Sealing plug 310 is threadingly engaged in a further, optionally stepped portion of bore 305 and contains a sealing ring 316 trapped in annular groove 317.

Figure 4:
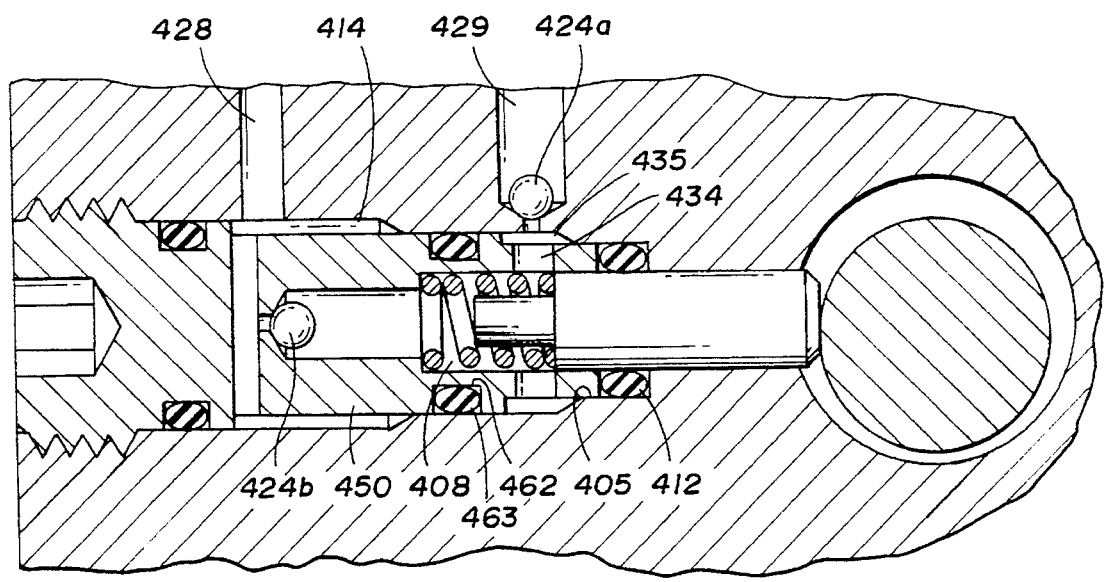
FIG. 4 illustrates a further embodiment of the subject invention ABS pump employing integral inlet and external outlet check valves.

Referring now to FIG. 4, the check plug 360 and cavity element 350 have been made integral as cavity element 450. Check balls 424a and 424b perform the same functions as check balls 324a and 324b, respectively. Cavity element 450 contains sealing ring 463 trapped in annular groove 462. Stationary seal 412 is maintained at the end of bore 405 by the end of cavity element 450. Inlet channels 428 and outlet channel 429 are connected to the pump cavity through annular recesses 414 and 435 formed as stepped portions of bore 405. High pressure fluid from the pump cavity 408 flows through radial channels 434 to recess 435.

In all embodiments, the seal member provided for engaging the pump plunger/piston and sealing brake fluid from the drive member is stationarily located within the pump housing and adapted to slidingly engage the relatively abrasion resistant surface of the piston element. Further, in all embodiments, the check valves, at least in part, are located separately of the pump plunger assembly.

One skilled in the art readily recognizes that many changes and adaptations may be made to those disclosed herein. For example, check ball springs may be disposed of in many cases resulting in more inexpensive manufacture and assembly at the cost of a modest loss of pumping efficiency. Further, the inlet and outlet channels and their associated passages may be adapted in shape and location. These and other modifications may be made without departing from the spirit of the invention.

What is claimed is:

1. A piston-type pump suitable for use in supplying pressurized fluid to an ABS system, comprising:
   a) a pump body containing a bore adapted to receive a piston element;
   b) a solid piston element having an elongated portion, said elongated portion sliding directly in said bore, one end of said piston element extending outwardly beyond said pump body;
   c) a return spring urging said piston outward of said pump body and onto sliding engagement with a drive member capable of imparting an oscillatory motion to said piston element;
   d) a stationary seal sealingly engaging said piston element;
   e) a pump cavity whose internal volume changes in response to said oscillatory motion of said piston element;
   f) inlet/outlet passages communicating with said pump cavity;
   g) inlet and outlet check valves adapted to ensure unidirectional flow of said fluid through said inlet/outlet passages.

2. A piston-type pump suitable for use in supplying pressurized fluid to an ABS system, comprising:
   a) a pump body containing a stepped bore having at least a first diameter and a second diameter, said second diameter being larger than said first diameter;
   b) a solid piston element having an elongated portion, said elongated portion sliding directly in said stepped bore of said first diameter, one end of said piston element extending outwardly beyond said pump body;
   c) a return spring urging said piston outward of said pump body and onto sliding engagement with a drive member capable of imparting an oscillatory motion to said piston element;

d) a stationary seal sealingly engaging said piston element and maintained in a recess, said recess being defined by an end of said stepped bore of said larger diameter and a plug element fixed in said stepped bore of said larger diameter;

e) a pump cavity whose internal volume changes in response to said oscillatory motion of said piston element;

f) inlet/outlet passages communicating with said pump cavity;

g) inlet and outlet check valves adapted to ensure unidirectional flow of said fluid through said inlet/outlet passages.

3. The pump of claim 2 wherein said plug element comprises a first portion having a diameter providing a sliding fit into said stepped bore of larger diameter and a second portion of larger diameter having a radiused portion between said first portion of said plug and said second portion of said plug, said radiused portion sealingly engaging a shoulder formed on an end of a stepped bore remote from said portion of said stepped bore of said first diameter.

4. The pump of claim 3 wherein said sealing engagement of said radi used portion against said shoulder is facilitated by staking over a portion of said pump body.

5. The pump of claim 2 wherein said plug threadedly engages said pump body, and wherein said plug further contains an annular groove in which is located an elastomeric plug sealing ring, said plug sealing ring adapted to prevent leakage of fluid between said pump body and said plug.

6. The pump of claim 1 wherein said pump body comprises aluminum.

7. The pump of claim 2 wherein said pump body comprises aluminum.

8. The pump of claim 5 wherein said elongated portion of said piston element is slidingly positioned in said bore of said first diameter without the interposition of a sleeve between said elongated portion of said piston element and said bore of said first diameter.

9. The pump of claim 2 wherein said pump cavity is cylindrical, the walls and a fixed end of which are defined by surfaces of said plug, a movable end of which is defined by said piston element.

10. The pump of claim 9 wherein surrounding said plug is an annular recess formed in said bore of said pump body, said pump cavity communicating with said annular recess through radial holes in said plug, said annular recess communicating with said inlet/outlet passage.

11. The pump of claim 10 wherein said annular recess contains a filter.

12. The pump of claim 2 wherein said plug element incorporates said inlet check valve.

13. The pump of claim 3 wherein said plug element incorporates said inlet check valve.

14. The pump of claim 1 wherein said inlet and outlet check valves are located external to the pump cavity.

15. The pump of claim 2 wherein said inlet and outlet check valves are located external to the pump cavity.

16. The pump of claim 14 wherein said pump body contains a check valve bore displaced from said bore, said check valve bore containing inlet and outlet check valves.

17. The pump of claim 15 wherein said pump body contains a check valve bore displaced from said stepped bore, said check valve bore containing inlet and outlet check valves.

18. The pump of claim 16, said check valve bore being substantially parallel to said piston bore, said check valves being in consecutive alignment coupled together by a common sleeve element and adapted to be installed in said check valve bore as a single unit.

19. The pump of claim 17, said check valve bore being substantially parallel to said piston bore, said check valves being in consecutive alignment coupled together by a common sleeve element and adapted to be installed in said check valve bore as a single unit.

20. A piston-type pump suitable for use in supplying pressurized fluid to an ABS system, comprising:

a) a light alloy pump body containing a stepped bore having at least a first diameter and a second diameter, said second diameter being larger than said first diameter;

b) a solid piston element having an elongated portion, said elongated portion sliding directly in said stepped bore of said first diameter without the interposition of a metal sleeve between the piston element and the pump body, one end of said piston element extending outwardly beyond said pump body;

c) a return spring urging said piston outward of said pump body and onto sliding engagement with a drive member capable of imparting an oscillatory motion to said piston element;

d) a stationary seal sealingly engaging said piston element and maintained in a recess, said recess being defined by an end of said stepped bore of said larger diameter and a plug element fixed in said stepped bore of said larger diameter;

e) a pump cavity whose internal volume changes in response to said oscillatory motion of said piston element;

f) inlet and outlet check valves located in a separate bore displaced from the axis of said stepped bore and adapted to provide unidirectional flow of fluid through said pump, said inlet and outlet check valves connected by a common sleeve and adapted to be inserted into said separate bore as a unitary assembly; and g) a fluid passage communicating between said pump cavity and said check valve bore.

* * * * *